United States Patent
Dawson et al.

(10) Patent No.: US 9,546,925 B2
(45) Date of Patent: Jan. 17, 2017

(54) PACKAGED SENSOR WITH INTEGRATED OFFSET CALIBRATION

(71) Applicant: FREESCALE SEMICONDUCTOR, INC., Austin, TX (US)

(72) Inventors: Chad S. Dawson, Queen Creek, AZ (US); Miguel A. Salhuana, Chandler, AZ (US); John B. Young, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 217 days.

(21) Appl. No.: 14/562,154

(22) Filed: Dec. 5, 2014

(65) Prior Publication Data

US 2016/0161355 A1   Jun. 9, 2016

(51) Int. Cl.
  *G01L 27/00* (2006.01)
(52) U.S. Cl.
  CPC .......... *G01L 27/005* (2013.01); *G01L 27/002* (2013.01)
(58) Field of Classification Search
  CPC ...... G01L 27/002; G01L 27/005; G01L 27/00; G01L 25/00
  See application file for complete search history.

(56) References Cited

U.S. PATENT DOCUMENTS

| 4,051,712 A * | 10/1977 | Zias ................. G01L 27/005 73/1.62 |
| 4,383,431 A | 5/1983 | Gelernt |
| 6,571,599 B1 | 6/2003 | Surjadi et al. |
| 7,076,386 B2 * | 7/2006 | Forti .................. G01L 17/00 702/98 |
| 7,788,056 B2 | 8/2010 | Beekhuizen et al. |
| 2011/0040206 A1 | 2/2011 | Burger et al. |
| 2011/0265899 A1* | 11/2011 | Cruse ............... G01L 27/005 137/565.23 |
| 2014/0068873 A1* | 3/2014 | Lee .................... G01B 5/24 8/137 |
| 2014/0174547 A1* | 6/2014 | Joo .................... D06F 39/087 137/2 |
| 2014/0278184 A1* | 9/2014 | Corder .............. G01L 27/002 702/98 |

FOREIGN PATENT DOCUMENTS

JP  2803966 B2 *  9/1998  ............. G01L 25/00

* cited by examiner

*Primary Examiner* — Nguyen Ha

(57) ABSTRACT

A mechanism is provided to field adjust offset values for packaged sensors incorporated in devices. Embodiments provide for a processor in the sensor package to measure current environmental conditions and set a zero offset for the sensors in the package in light of those current environmental conditions. In this manner, any changes in the sensor over the sensor's lifetime and current environmental conditions that can affect functioning of the sensor can be accounted for in operational measurements taken by the device.

17 Claims, 2 Drawing Sheets

PACKAGED SENSOR WITH INTEGRATED OFFSET CALIBRATION

BACKGROUND

Field

This disclosure relates generally to sensor devices, and more specifically, to providing a field usable, integrated offset calibration in a packaged microelectromechanical sensor device.

Related Art

Packaged semiconductor sensors are being included in more and more devices annually. In many cases, the so-called "Internet of Things" relies upon the presence of packaged semiconductor sensors to provide the environmental data necessary to the multitude of applications found in the network of devices. In addition, proper functioning of many consumer devices, such as washing machines, dryers, mobile devices, and the like, depend upon accurate sensor readings.

Sensors are found in many varied environmental conditions, such as humidity, water levels, temperatures, accelerations, impacts, and the like. While sensors are typically calibrated at the factory, and in many cases by the equipment manufacturers who incorporate the sensors in their devices, these varied environmental conditions and the age of the device can cause the sensors to drift from their factory values. In order to continue to properly function, it is desirable to have a mechanism to field adjust the sensors to account for this drift.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism to field adjust offset values for packaged sensors incorporated in devices. Embodiments provide for a processor in the sensor package to measure current environmental conditions and set a zero offset for the sensors in the package in light of those current environmental conditions. In this manner, any changes in the sensor over the sensor's lifetime and current environmental conditions that can affect functioning of the sensor can be accounted for in operational measurements taken by the device.

Packaged sensors can take a variety of forms depending upon the nature of the device in which they are incorporated. For example, many mobile devices incorporate one or more of accelerometers, gyroscopes, magnetometers, and light sensors in order to determine orientation of the device and environmental conditions. Washing machines and dishwashers can incorporate pressure sensors in order to determine water levels in the device. Dryers can incorporate humidity sensors to determine dryness levels of clothes. Cameras can also incorporate gyroscopes, magnetometers, and accelerometers in order to determine orientation of the camera. Some sensors are a single sensing device, such as a pressure sensor, while others may include several sensing devices, such as gyroscopes and accelerometers, where it may be desirable to determine accelerations and rotations in several axes simultaneously.

Figure 1:
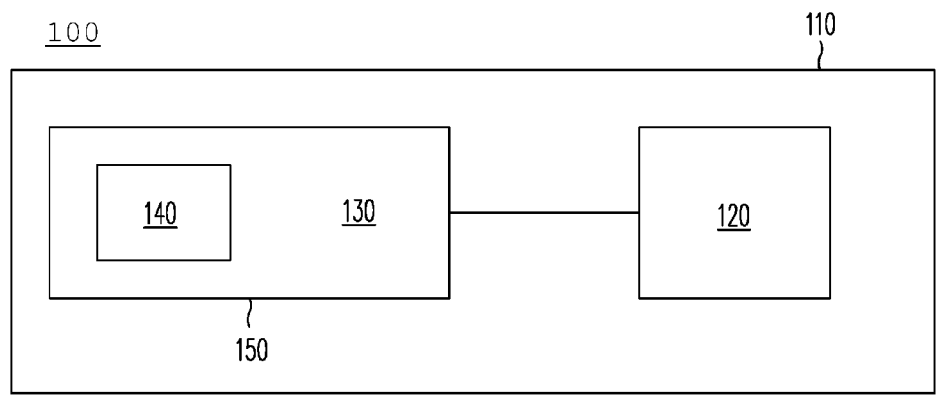
FIG. 1 is a simplified block diagram illustrating an example of components in a sensor package, usable in conjunction with embodiments of the present invention.

FIG. 1 is a simplified block diagram illustrating an example of components in a sensor package, usable in conjunction with embodiments of the present invention. Sensor package 100 includes a packaged device 110. Packaged device 110 incorporates a sensor device 120, such as a pressure sensor or an accelerometer. Sensor device 120 can generate analog signals, such as capacitance changes, in response to those environmental conditions for which it is designed to measure. Sensor device 120 can communicate these analog signals to a processing device 130 that is incorporated in the sensor package. Processing device 130 can take the form of an application specific integrated circuit (ASIC) or microcontroller (MCU) or other type of processor, depending upon the application. Processing device 130 can incorporate a memory 140 that can include registers to store temporary values and factory determined data. Processing device 130 can communicate with components external to packaged device 110 through one or more input/output (I/O) ports 150. The signals provided through I/O ports 150 can be typically digital, and are processed data representing the environmental conditions measured by sensor device 120.

Figure 2:
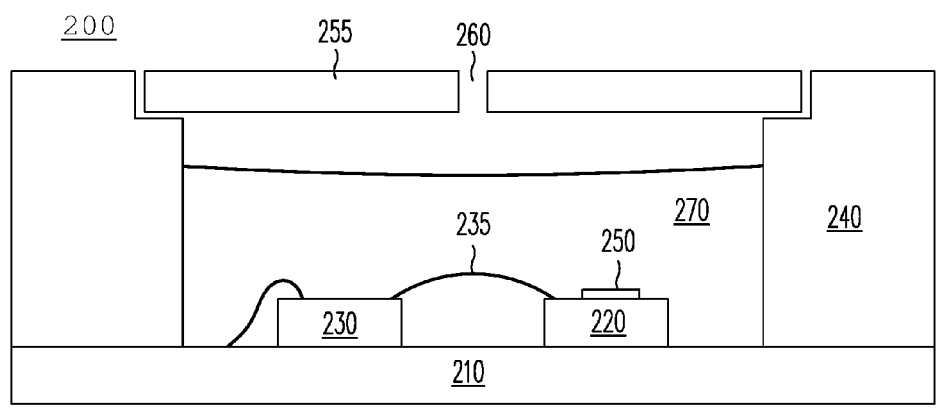
FIG. 2 is a simplified block diagram illustrating an example of a pressure sensor package, usable in conjunction with embodiments of the present invention.

FIG. 2 is a simplified block diagram illustrating an example of a pressure sensor package, usable in conjunction with embodiments of the present invention. While a pressure sensor package is used for illustration of some of the principals of the present invention, it should be noted that embodiments of the present invention are not limited to pressure sensor devices. Pressure sensor package 200 includes a package substrate 210. Package substrate 210 has mounted thereon a pressure sensor cell (Pcell) 220 and a processing device 230, such as an ASIC. Package substrate 210 can provide electronic coupling between processing device 230 and devices external to the package. Electronic coupling between Pcell 220 and processing device 230 is provided by wire bond 235, but alternatively can be provided by package substrate 210. Alternate package configurations can have the Pcell mounted on the processing device in a stacked configuration, or vice versa. A cavity package is formed on the substrate by molded region 240.

Pcell 220 has a pressure sensitive membrane 250. Pressure sensitive membrane 250 deforms in response to fluid pressures exerted on the pressure sensitive membrane through a fluid inlet 260 formed in package cap 255. External fluid pressures asserted through fluid inlet 260 are transmitted to Pcell 220 via gel 270. Gel 270 prevents external contaminants and water from deteriorating the surface of the Pcell and the various metal contacts.

In one typical Pcell, as the pressure sensitive membrane deforms, a capacitance change within the Pcell is measured and supplied to the processing device for analysis. In another types of Pcells, a resistance changes in response to applied pressure and a voltage change is supplied to the processing device for analysis. When a Pcell is manufactured, the Pcell can be calibrated to a factory offset. That is, the capacitance (or voltage) generated by the Pcell at a known environmental condition can be measured. The behavior of the Pcell in response to varying pressures can also be determined or may be known in light of all production Pcells. Subsequently, when the Pcell is operationally used, the generated capacitances are compared to the known factory offset to determine the pressure being exerted on the Pcell.

As discussed above, sensor devices, such as Pcell 220, are subject to operational and manufacturing conditions that can affect their performance and cause the sensor device to drift from the known factory offset in practice. For example, when the sensor package is mounted to a printed circuit board which has a different response to temperature variation, there can be stresses put on both the printed circuit board and the sensor package. These stresses can alter the shape of the package and thereby also alter how the pressure sensitive membrane responds to pressure changes. The effect of these stresses can be measured using test devices, and a board mount offset can also be applied to the factory offset so that a more realistic practical offset is used for environmental measurement (e.g., pressure).

In addition, different portions of the pressure sensor package itself can expand and contract at different rates due to temperature changes and different coefficients of thermal expansion. For example, the package substrate can have a different thermal response than the cavity molding for the package. These different thermal responses can also create stresses in the package that alter how the pressure sensitive membrane responds to pressure changes. In this case, a package stress offset can be measured over a set of test samples and applied to the factory offset to provide a more realistic practical offset for environmental measurement (e.g., pressure).

Also, as discussed above, the sensor can exhibit different responsiveness over time due to exposure to differing environmental conditions and the ageing of the materials from which the sensor device is constructed. This change in responsiveness, called long-term drift, can be tested and measured for sample devices by the manufacturer. A formula can be provided to the processing device in production devices so that the factory offset can be adjusted as the device ages, again thereby providing a better practical offset for environmental measurement.

These statistical offset corrections can help to adjust the factory offset so that, in practice, the data from the sensor device is interpreted in a more accurate fashion as the sensor device is used. But since these offset corrections are based upon statistical analysis, they cannot take into account operational environmental conditions experienced by a specific device being used in the field. For example, in some sensors and applications, it can be important to determine an operational offset (e.g., an operational "zero" to which other measurements are compared) during operation of a device incorporating the sensor. The operational offset can thereby take into account current temperature, current humidity, and the like, that are causing stresses on the device at the time of setting the operational offset. Embodiments of the present invention provide a mechanism for generating such an operational offset within the pressure sensor package itself.

Figure 3:
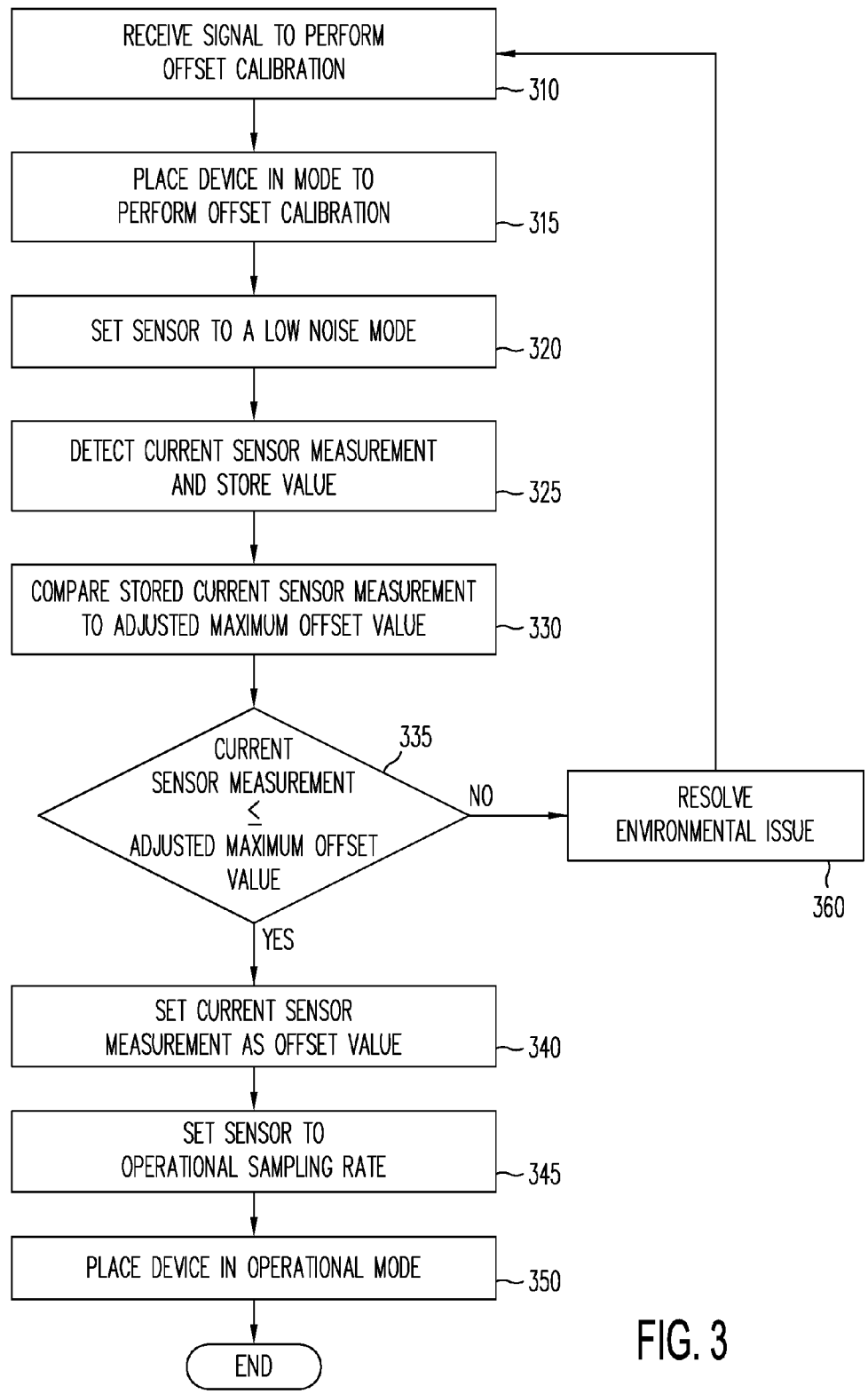
FIG. 3 is a simplified flow diagram illustrating steps that can be performed by a sensor device package to set an operational offset in light of environmental conditions being experienced by the sensor device package, in accordance with embodiments of the present invention.

FIG. 3 is a simplified flow diagram illustrating steps that can be performed by a sensor device package to set an operational offset in light of environmental conditions being experienced by the sensor device package, in accordance with embodiments of the present invention. The process for determining and setting the operational offset can begin with a signal received by the package processing device to perform the offset calibration (310). Such a signal can take the form of a control bit that is set to a zero (0) level when not running an offset calibration and a one (1) level when running the offset calibration. This signal can be received from a microcontroller or other processor in the device incorporating the sensor device package. The sensor device package can be set in a mode to perform the offset calibration (315). In some embodiments, this mode is a standby mode so that other utilities cannot attempt to access the sensor during the offset calibration process. It should be noted that the sensor device package can be placed in this mode in response to receiving the signal of step 310 or the sensor device package can have already been placed in this mode prior to receiving the signal of step 310 (e.g., during a startup operation of the device incorporating the sensor device package).

In order to generate an accurate operational offset, the sensor device can be placed in a low noise mode (320). Such a low noise mode can include operating the sensor at a high sampling rate in order to get the best environmental data associated with the sensor. Using this low noise mode, a current measurement of the environmental conditions for which the sensor is designed to detect is made (325) and this value is stored. For example, this current measurement can include a current pressure impacting the pressure sensitive membrane of a Pcell. As another example, this can include a current rotation acceleration or linear acceleration at each axis of a multi-axis sensor, such as a gyroscope or an accelerometer, respectively. The current measurement can be stored in registers provided in the processing device of the sensor device package or registers coupled to processing device in the sensor device package. In the example of a pressure sensor, this current measurement reflects an existing pressure measurement that can be used as an offset, should additional tests be satisfied, as discussed below.

The stored current sensor measurement is then compared to an adjusted maximum offset value (330). The adjusted maximum offset value can be a combination of several offset values that have been discussed above, including, for example, a maximum offset value set at the factory in light of the factory offset value discussed above, a statistical board mount offset due to board mount stresses, a statistical package stress offset due to package stresses, and a formulaic or tabular long-term drift offset. These various offsets can be stored in one or more registers associated with the package processing device, and applied during the comparison or applied one time at the factory to adjust the factory offset, if appropriate. Alternatively, a manufacturer of a device incorporating a sensor package can preset a value for the adjusted maximum offset value in light of known operational conditions for the device. For example, a pressure sensor in a bilge pump can have a preset value that takes into account that there is always a certain amount of water in a bilge area.

A determination can be made as to whether the current sensor measurement is less than the adjusted maximum offset value (335). If the current sensor measurement is less than the adjusted maximum offset value, then the current sensor measurement can be used as the operational offset value (340). Once the operational offset value is set, then sensor can be reset to the operational sampling rate (345) and placed into an operational mode (350). During operational mode, the operational offset value becomes the sensor value to which all other sensor measurements are compared. In effect, the operational offset value becomes an environmental "zero" value.

If the current sensor measurement is greater than the adjusted maximum offset value, however, this can mean that there is an environmental condition being experienced by the sensor device that is greater than anticipated for a "zero" condition, and that environmental issue should be resolved (360). In one example, a washing machine may not have fully emptied during a previous use. If the washing machine initializes while the tub is not empty, during which the operational offset is determined, and the pressure sensor experiences the water level of the non-emptied tub, the system may resolve the issue by emptying the tub and restarting the initialization sequence (or at least the operational offset calibration process).

Embodiments of the present invention allow for adjustments to be made to operational parameters of sensors in the field. In this manner, a sensor can be used with greater accuracy over the lifetime of use of that sensor in light of ageing, changing environmental conditions, and the like. Embodiments provide such functionality using components within the sensor package itself, thereby reducing consumption of resources external to the sensor package, and further enabling such functionality to be implemented specifically for the sensors in the package itself.

By now it should be appreciated that there has been provided a method for setting an offset calibration for a sensor in a sensor package that includes a sensor, a memory, and a processor. The method includes placing the sensor package in a standby mode, detecting a current sensor measurement, storing (in the memory) a current sensor value corresponding to the current sensor measurement, and setting (by the processor) the current sensor value as an operational offset value if the current sensor value is less than or equal to an adjusted maximum offset value. The adjusted maximum offset value is determined using a factory-set offset value.

One aspect of the above embodiment further includes setting the sensor in a low noise mode prior to detecting the current sensor measurement. In a further aspect, setting the sensor in a low noise mode includes operating the sensor at or near a maximum sampling rate for the sensor. A still further aspect includes setting the sensor to an operational sampling rate subsequent to setting the current sensor value as the operational offset value. A yet further aspect includes placing the sensor package out of standby mode subsequent to setting the sensor to the operational sampling rate.

Another aspect of the above embodiment further includes receiving a signal from a source external to the sensor package to initiate the offset calibration. The receiving occurs prior to performing the detecting of the current sensor measurement. In a further aspect, the source external to the sensor package includes an external processor. In another further aspect, the source external to the sensor package generates the signal upon a reset of a system that incorporates the sensor package.

Another aspect of the above embodiment further includes transmitting an indication that the current sensor value is greater than the adjusted maximum offset value, if the current sensor value is greater than the adjusted maximum offset value. This transmitting is performed by the processor. In another aspect, the adjusted maximum offset value is further determined using one or more of a board mount offset, a package stress offset, and long-term drift calculation.

Another embodiment of the present invention provides a sensor package that includes a sensor device, a processor coupled to the sensor device, and a molded encapsulant forming a cavity package around the sensor device and the processor. The processor is configured to perform an offset calibration of the sensor device to determine an offset value using current environmental conditions experienced by the sensor device, and to interpret sensor data in light of the offset value subsequent to the offset calibration.

In one aspect of the above embodiment, the processor is further coupled to an external processor located external to the sensor device package, and is configured to receive a signal from the external processor to conduct the performing of the offset calibration.

In another aspect of the above embodiment, the processor is configured to perform the offset calibration by virtue of being further configured to place the sensor package in a standby mode, detect a current sensor measurement of the current environmental conditions, store (in a memory coupled to the processor) a current sensor value corresponding to the current sensor measurement, set the current value as an operational offset value, if the current sensor value is less than or equal to an adjusted maximum offset value. The adjusted maximum offset value is determined using a factory-set offset value and the factory-set offset value is stored in the memory. In a further aspect, the processor is configured to perform the offset calibration by being configured to set the sensor in a low noise mode prior to detecting the current sensor measurement. In a still further aspect, the processor is configured to set the sensor in low noise mode by being configured to operate the sensor at or near a maximum sampling rate for the sensor. In a yet further aspect, the processor is configured to perform the offset calibration by virtue of being further configured to set the sensor to an operational sampling rate subsequent to setting the current sensor value as the operational offset value. In still a further aspect, the processor is configured to perform the offset calibration by virtue of being further configured to place the sensor package out of standby mode subsequent to setting the sensor to the operational sampling rate.

In another aspect, the sensor device includes a pressure sensor and the current environmental conditions include a fluid pressure externally applied to the pressure sensor. Another aspect is a system that includes the sensor device package embodiment. In a further aspect, the system includes a washing machine, the sensor device is a pressure sensor, the current environmental conditions include a fluid pressure externally applied to the pressure sensor, and the fluid pressure corresponds to a water level in the washing machine.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, and the like.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for setting an offset calibration for a sensor in a sensor package comprising a sensor, a memory, and a processor, the method comprising:
   placing the sensor package in a standby mode;
   detecting a current sensor measurement;
   storing, in the memory, a current sensor value corresponding to the current sensor measurement;
   setting, by the processor, the current sensor value as an operational offset value, if the current sensor value is less than or equal to an adjusted maximum offset value, wherein the adjusted maximum offset value is determined using a factory-set offset value.

2. The method of claim 1 further comprising:
   setting the sensor in a low noise mode prior to said detecting the current sensor measurement.

3. The method of claim 2 wherein setting the sensor in the low noise mode comprises operating the sensor at or near a maximum sampling rate for the sensor.

4. The method of claim 3 further comprising:
   setting the sensor to an operational sampling rate subsequent to setting the current sensor value as the operational offset value.

5. The method of claim 4 further comprising placing the sensor package out of standby mode subsequent to said setting the sensor to the operational sampling rate.

6. The method of claim 1 further comprising:
   receiving, by the processor, a signal to initiate the offset calibration, wherein said receiving occurs prior to performing said detecting the current sensor measurement.

7. The method of claim 1 further comprising:
   transmitting, by the processor, an indication that the current sensor value is greater than the adjusted maximum offset value, if the current sensor value is greater than the adjusted maximum offset value.

8. The method of claim 1, wherein the adjusted maximum offset value is further determined using one or more of a board mount offset, a package stress offset, and long-term drift calculation.

9. A sensor device package comprising:
   a sensor device;
   a processor coupled to the sensor device and configured to
      perform an offset calibration of the sensor device to determine an offset value using current environmental conditions experienced by the sensor device, and
      interpret sensor data in light of the offset value subsequent to said offset calibration; and
   a molded encapsulant forming a cavity package around the sensor device and the processor.

10. The sensor device package of claim 9 wherein the sensor device comprises a pressure sensor and the current environmental conditions comprise a fluid pressure externally applied to the pressure sensor.

11. The sensor device package of claim 9 wherein the processor is further coupled to an external processor located external to the sensor device package, and configured to receive a signal from the external processor to conduct said performing the offset calibration.

12. The sensor device package of claim 9 wherein the processor is configured to perform the offset calibration by virtue of being further configured to
   place the sensor package in a standby mode;
   detect a current sensor measurement of the current environmental conditions;
   store, in a memory coupled to the processor, a current sensor value corresponding to the current sensor measurement;
   set the current sensor value as an operational offset value, if the current sensor value is less than or equal to an adjusted maximum offset value, wherein
      the adjusted maximum offset value is determined using a factory-set offset value, and
      the factory-set offset value is stored in the memory.

13. The sensor device package of claim 12 wherein the processor is configured to perform the offset calibration by virtue of being further configured to
   set the sensor in a low noise mode prior to detecting the current sensor measurement.

14. The sensor device package of claim 13 wherein the processor is configured to set the sensor in the low noise mode by virtue of being further configured to operate the sensor at or near a maximum sampling rate for the sensor.

15. The sensor device package of claim 14 wherein the processor is configured to perform the offset calibration by virtue of being further configured to set the sensor to an operational sampling rate subsequent to setting the current sensor value as the operational offset value.

16. The sensor device package of claim 15 wherein the processor is configured to perform the offset calibration by virtue of being further configured to place the sensor package out of standby mode subsequent to said setting the sensor to the operational sampling rate.

17. A system comprising the sensor device package of claim 9.

* * * * *